(12) United States Patent
Matsumoto et al.

(10) Patent No.: US 10,816,380 B2
(45) Date of Patent: Oct. 27, 2020

(54) AIR FLOW METER

(71) Applicant: HITACHI AUTOMOTIVE SYSTEMS, LTD., Hitachinaka-shi, Ibaraki (JP)

(72) Inventors: Masahiro Matsumoto, Tokyo (JP); Hiroshi Nakano, Tokyo (JP); Akira Uenodan, Hitachinaka (JP)

(73) Assignee: HITACHI AUTOMOBILE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/614,996

(22) PCT Filed: Mar. 29, 2018

(86) PCT No.: PCT/JP2018/013118
§ 371 (c)(1),
(2) Date: Nov. 19, 2019

(87) PCT Pub. No.: WO2018/225350
PCT Pub. Date: Dec. 13, 2018

(65) Prior Publication Data
US 2020/0200583 A1    Jun. 25, 2020

(30) Foreign Application Priority Data
Jun. 5, 2017   (JP) .................. 2017-111055

(51) Int. Cl.
*G01F 5/00*   (2006.01)
*G01F 1/69*   (2006.01)
*G01F 1/72*   (2006.01)

(52) U.S. Cl.
CPC ................... *G01F 5/005* (2013.01)

(58) Field of Classification Search
CPC ............. G01F 1/69; G01F 1/72; G01F 5/00
See application file for complete search history.

(56) References Cited

U.S. PATENT DOCUMENTS 5,435,180 A * 7/1995 Uchiyama ............. F02D 41/187
                                                 73/204.19
7,286,925 B2 * 10/2007 Lang ..................... G01F 1/72
                                                    701/114
(Continued)

FOREIGN PATENT DOCUMENTS

| JP | 54-001662 A | 1/1979 |
| JP | 2007-522479 A | 8/2007 |
| JP | 2012-112716 A | 6/2012 |

OTHER PUBLICATIONS

International Search Report, PCT/JP2018/013118, dated Jul. 31, 2018, 1 pg.

*Primary Examiner* — Jewel V Dowtin
(74) *Attorney, Agent, or Firm* — Volpe Koenig

(57) ABSTRACT

An air flow meter capable of rapidly following a change of a pulsation state of an input signal includes: an air flow rate detection element that generates an input signal Qsen relating to an air flow rate to be measured; and a calculation unit that performs calculation to generate an output signal Qout in response to the input signal Qsen. The calculation unit includes: the output signal calculation unit that performs calculation including exponentiation of raising the power of the output signal Qout by more than one; the input signal calculation unit that performs calculation on the input signal Qsen; the subtractor that obtains the difference between the calculation results by the output signal calculation unit and the input signal calculation unit; and the integrator that integrates the difference obtained by the subtractor, and the output signal Qout is generated based on the output from the integrator.

10 Claims, 15 Drawing Sheets

(56) References Cited

U.S. PATENT DOCUMENTS

| | | | |
|---|---|---|---|
| 7,499,819 B2* | 3/2009 | Kanke | G01F 1/6965 |
| | | | 702/100 |
| 7,882,735 B2* | 2/2011 | Hanzawa | G01F 1/72 |
| | | | 73/204.25 |
| 2007/0192047 A1 | 8/2007 | Foucault et al. | |
| 2018/0299309 A1* | 10/2018 | Matsumoto | G01F 1/6965 |

* cited by examiner (a) WAVEFORM OF INPUT SIGNAL Qsen (b) WAVEFORM OF OUTPUT SIGNAL $Q_{OUT}$
(WHEN CUTOFF FREQUENCY IS PROPORTIONAL TO Qsen)

(c) WAVEFORM OF OUTPUT SIGNAL $Q_{OUT}$
(WHEN CUTOFF FREQUENCY IS PROPORTIONAL TO Qout)

AIR FLOW METER

TECHNICAL FIELD

The present invention relates to an air flow meter.

BACKGROUND ART

Conventionally, there is a demand for reduction of a pulsation error caused by pulsation of an input signal in an air flow meter that outputs an air flow rate signal in response to the input signal from an air flow rate detection element. As an example of a method of reducing the pulsation error, the technique disclosed in PTL 1 is known. In this technique, an average processing unit obtains an average value in a microcomputer based on an input signal from an intake air rate detector, and a radio frequency analysis unit obtains a frequency and a pulsation amplitude using fast Fourier transform. Then, a correction unit of the microcomputer calculates a correction amount based on the obtained average value, frequency, and pulsation amplitude to correct the input signal. As a result, a pulsation error caused by the pulsation of the input signal from an intake air amount detector is corrected.

CITATION LIST

Patent Literature

PTL 1: JP 2012-112716 A

SUMMARY OF INVENTION

Technical Problem

The fast Fourier transform is used in the radio frequency analysis unit in the related art disclosed in PTL 1. A predetermined length of observation time and a sampling frequency are required in order to obtain desired frequency analysis range and resolution in the fast Fourier transform. In addition, the amount of calculation exponentially increases depending on the frequency analysis range and resolution. Therefore, a predetermined observation time and a predetermined calculation time are required until a result of the fast Fourier transform is output, and it takes a long time to calculate the correction amount, and thus, it is difficult to follow a change of a pulsation state of the input signal. In this manner, no consideration is given to the change of the pulsation state of the input signal in the above-described related art.

The present invention has been made in view of the above circumstances, and the main object thereof is to provide an air flow meter capable of rapidly following a change of a pulsation state of an input signal.

Solution to Problem

An air flow meter according to an aspect of the present invention includes: an air flow rate detection element that generates an input signal relating to an air flow rate to be measured; and a calculation unit that performs a calculation to generate an output signal in response to the air flow rate based on the input signal. The calculation unit includes: an output signal calculation unit that performs calculation including exponentiation of raising the power of the output signal by more than one; an input signal calculation unit that performs calculation on the input signal; a subtractor that obtains a difference between a calculation result by the output signal calculation unit and a calculation result by the input signal calculation unit; and an integrator that integrates the difference obtained by the subtractor. The output signal is generated based on an output from the integrator. An air flow meter according to another aspect of the present invention includes: an air flow rate detection element that generates an input signal relating to an air flow rate to be measured; and a calculation unit that performs calculation to generate an output signal in response to the air flow rate based on the input signal. The calculation unit has a low-pass filter function of cutting off a frequency component equal to or higher than a predetermined cutoff frequency from the input signal. The cutoff frequency changes depending on an instantaneous value of the output signal.

Advantageous Effects of Invention

According to the present invention, it is possible to provide the air flow meter capable of rapidly following the change of the pulsation state of the input signal.

DESCRIPTION OF EMBODIMENTS

Hereinafter, embodiments of the present invention will be described with reference to drawings. In addition, the respective embodiments can be combined as long as there is no contradiction.

First Embodiment

Figure 1:
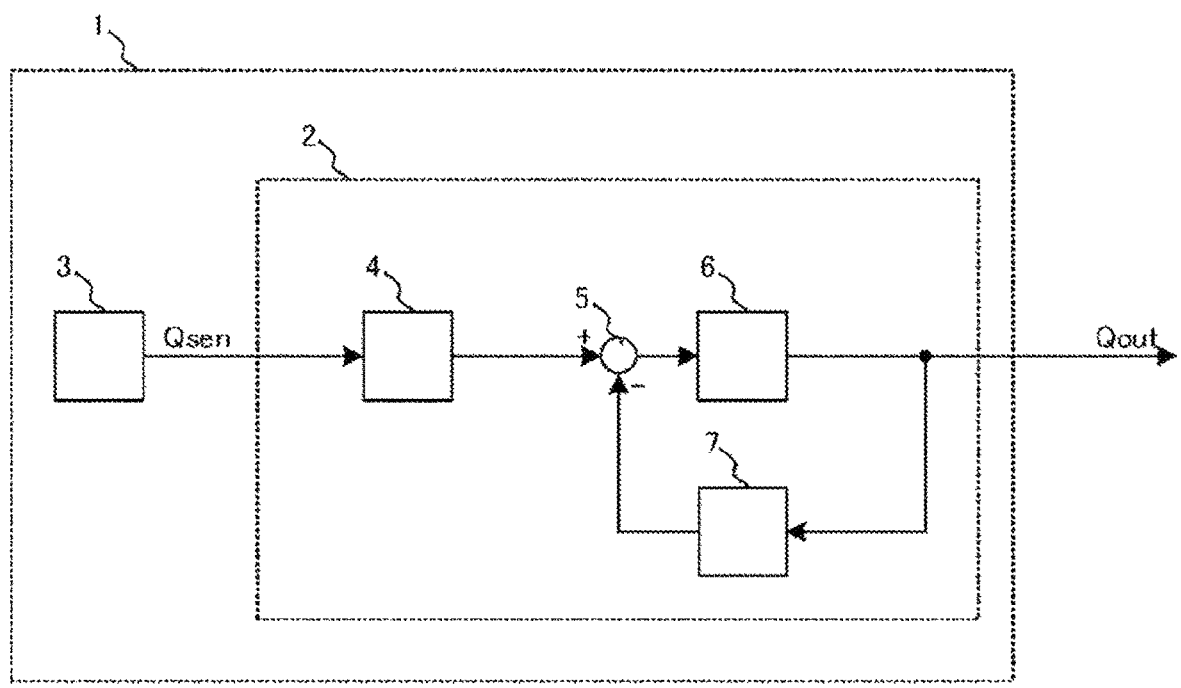
FIG. 1 is a diagram illustrating a configuration of an air flow meter according to a first embodiment of the present invention.

First, an air flow meter according to a first embodiment of the present invention will be described with reference to FIGS. 1 to 11. FIG. 1 is a diagram illustrating a configuration of an air flow meter 1 according to the first embodiment of the present invention. As illustrated in FIG. 1, the air flow meter 1 of the present embodiment is constituted by a calculation unit 2 and an air flow rate detection element 3. An air flow rate detection element 3 generates a signal relating to an air flow rate to be measured by the air flow meter 1, and outputs the signal as an input signal Qsen to the calculation unit 2. The calculation unit 2 performs calculation to generate an output signal Qout in response to the air flow rate based on the input signal Qsen input from the air flow rate detection element 3.

The calculation unit 2 includes an input signal calculation unit 4, a subtractor 5, an integrator 6, and an output signal calculation unit 7. The input signal calculation unit 4 performs predetermined calculation on the input signal Qsen from the air flow rate detection element 3. The output signal calculation unit 7 performs predetermined calculation including exponentiation of raising the power of the output signal Qout by more than one. Details of the calculation performed by each of the input signal calculation unit 4 and the output signal calculation unit 7 will be described later.

The subtractor 5 obtains a difference between a calculation result of the output signal calculation unit 7 and a calculation result of the input signal calculation unit 4. The integrator 6 integrates the difference obtained by the subtractor 5 to generate and output the output signal Qout.

Figure 2:
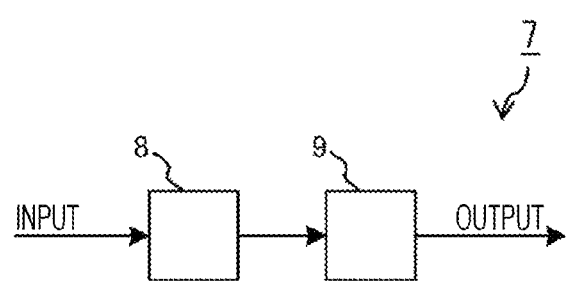
FIG. 2 is a diagram illustrating a configuration of an output signal calculation unit.

FIG. 2 is a diagram illustrating a configuration of the output signal calculation unit 7. As illustrated in FIG. 2, the output signal calculation unit 7 is constituted by a multiplier 8 that multiplies the output signal Qout by a predetermined proportionality constant, and an exponentiator 9 that performs exponentiation of the output signal Qout.

Figure 3:
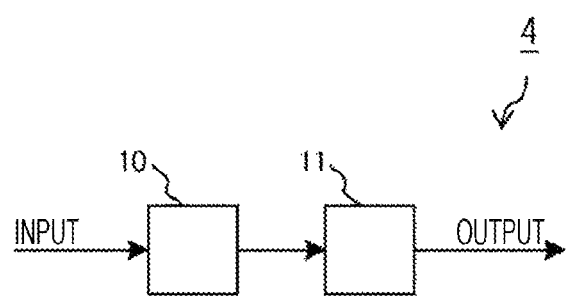
FIG. 3 is a diagram illustrating a configuration of an input signal calculation unit.

FIG. 3 is a diagram illustrating a configuration of the input signal calculation unit 4. As illustrated in FIG. 3, the input signal calculation unit 4 is constituted by a multiplier 10 that multiplies the input signal Qsen by a predetermined proportionality constant, and an exponentiator 11 that performs exponentiation of the input signal Qsen.

Figure 4:
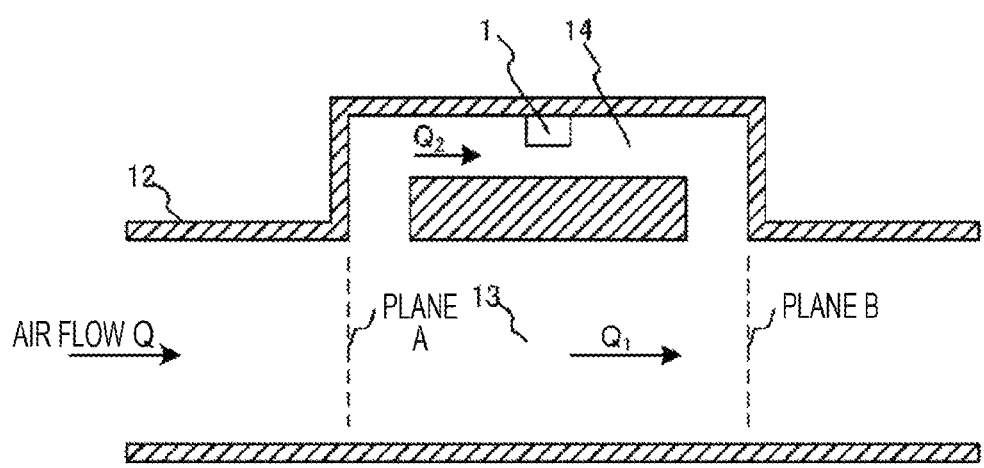
FIG. 4 is a view illustrating an arrangement example of the air flow meter in an intake pipe.

Next, the arrangement of the air flow meter 1 in an intake pipe will be described with reference to FIG. 4. FIG. 4 is a view illustrating an arrangement example of the air flow meter 1 in the intake pipe. As illustrated in FIG. 4, air flow of an air flow rate Q to be measured by the air flow meter 1 flows into an intake pipe 12. The intake pipe 12 is provided with a main passage 13 and a sub-passage 14 branched from the main passage 13. The air flow meter 1 is installed in the sub-passage 14.

The air flow rate Q flowing through the intake pipe 12 is branched into the main passage 13 and the sub-passage 14. Assuming that air flow rates in the main passage 13 and the sub-passage 14 are Q1 and Q2, respectively, a pressure difference Δp between a plane A and a plane B illustrated in FIG. 4 can be expressed by the following Formulas (1) and (2) using the Navier-Stokes equation.

[Formula 1]
$$\frac{\Delta p}{\rho} = L_1 \frac{dQ_1}{dt} + \frac{1}{2} C_1 Q_1^2 \quad (1)$$

[Formula 2]
$$\frac{\Delta p}{\rho} = L_2 \frac{dQ_2}{dt} + \frac{1}{2} C_2 Q_2^2 \quad (2)$$

The respective constants in Formulas (1) and (2) are defined as follows.
ρ: Density of fluid
L1: Passage length of main passage 13
L2: Passage length of sub-passage 14
C1: Loss factor of main passage 13
C2: Loss factor of sub-passage 14

Here, when Formula (2) is substituted into Formula (1) to obtain Q1, the following Formula (3) is obtained.

[Formula 3]
$$Q_1 = \frac{L_2}{L_1} Q_2 + \frac{1}{L_1} \int \left( \frac{1}{2} C_2 Q_2^2 - \frac{1}{2} C_1 Q_1^2 \right) dt \quad (3)$$

Here, since Q=Q1+Q2, the air flow rate Q flowing through the intake pipe 12 can be obtained by the following Formula (4).

[Formula 4]
$$Q = \frac{L_2}{L_1} Q_2 + \frac{1}{L_1} \int \left( \frac{1}{2} C_2 Q_2^2 - \frac{1}{2} C_1 Q_1^2 \right) dt + Q_2 \quad (4)$$

Here, if it can be assumed that Q2 is sufficiently small compared to Q1, Formula (4) can be transformed as the following Formula (5).

[Formula 5]
$$Q = \frac{L_2}{L_1} Q_2 + \frac{1}{L_1} \int \left( \frac{1}{2} C_2 Q_2^2 - \frac{1}{2} C_1 Q_1^2 \right) dt \quad (5)$$

Furthermore, if it can be assumed that a flow velocity change of Q is sufficiently slow, Formula (5) can be transformed as the following Formula (6).

[Formula 6]
$$Q = \int \left( \frac{C_2}{2L_3} Q_2^2 - \frac{C_1}{2L_3} Q^2 \right) dt \quad (6)$$

In the arrangement of FIG. 4, an air flow rate that the air flow meter 1 actually measures using the air flow rate detection element 3 is the air flow rate Q2 of the sub-passage 14. Thus, the air flow rate Q flowing through the intake pipe 12 can be determined from time to time based on the air flow rate Q2 of the sub-passage 14 measured by the air flow rate detection element 3 by solving the above Formula (6). This is established even when the air flow rate Q flowing through the intake pipe 12 is in a pulsation state. That is, no matter what the pulsation state of the air flow rate Q flowing through the intake pipe 12 is, the air flow rate Q flowing through the intake pipe 12 can be accurately obtained without being affected by the pulsation using Formula (6). That is, it is possible to eliminate a pulsation error caused by the pulsation.

In addition, the air flow rate Q flowing through the intake pipe 12 can be obtained from time to time based on the air flow rate Q2 of the sub-passage 14 using the above Formula (6) even if a pulsation waveform of the input signal input from the air flow rate detection element 3 to the calculation unit 2 is not a sine wave but a distorted waveform including harmonics. Thus, it is possible to achieve reduction of the pulsation error.

In the related art of PTL 1, an average value, a frequency, and a pulsation amplitude are obtained as representative values from the pulsation waveform of the input signal, and the correction amount is calculated based on these values. Thus, if these values obtained from the pulsation waveform are equal, the same correction is applied to the input signal. However, a pulsation waveform of an actual input signal is a waveform having a large distortion, and it is difficult to calculate an appropriate correction amount corresponding to this distortion in the related art. Meanwhile, a scheme in which the air flow rate Q flowing through the intake pipe 12 is obtained from time to time based on the air flow rate Q2 of the sub-passage 14 using the above-described Formula (6) is adopted in the air flow meter 1 of the present embodiment. Thus, even if the pulsation waveform of the input signal is distorted, the air flow rate Q flowing through the intake pipe 12 can be obtained from time to time based on the flow rate Q2 of the sub-passage 14. That is, it is possible to provide the method of correcting the input signal which is not affected by the distortion of the pulsation waveform.

In the air flow meter 1 of the present embodiment, the output signal calculation unit 7 performs calculation to obtain the second term of the right side of Formula (6), that is, C1/2/L1*Q*Q. Specifically, using Q=Qout, the multiplier 8 performs multiplication of a proportionality constant corresponding to C1/2/L1 on the output signal Qout, and the exponentiator 9 performs exponentiation corresponding to Qout*Qout, that is, calculates the second power of the output signal Qout. In addition, the input signal calculation unit 4 performs calculation to obtain the first term of the right side of Formula (6), that is, C2/2/L1*Q2*Q2. Specifically, using Q2=Qsen, the multiplier 10 performs multiplication of a proportionality constant corresponding to C2/2/L1 on the input signal Qsen, and the exponentiator 11 performs exponentiation corresponding to Qsen*Qsen, that is, calculates the second power of the input signal Qsen. Then, the subtractor 5 obtains a difference between a calculation result of the output signal calculation unit 7 and a calculation result of the input signal calculation unit 4, and then, the integrator 6 integrates the difference obtained by the subtractor 5. As a result, the implicit function illustrated in Formula (6) is solved to obtain the output signal Qout from which the pulsation error has been removed.

The air flow meter 1 of the present embodiment enables high-speed processing with a small amount of calculation by the above configuration, and provides a pulsation error correction process capable of rapidly following a change of the pulsation state of the input signal.

Incidentally, there is no problem even if loss factors C1 and C2 are treated as fixed values in most cases in the above-described calculation processing, and thus, the power is set to two in accordance with Formula (6), and each of the output signal Qout and the input signal Qsen is squared in the exponentiators 9 and 11. However, the loss factors C1 and C2 are represented as functions of the air flow rates Q1 and Q2, respectively, in an actual passage structure of the intake pipe 12. In consideration of this point, an output characteristics of the output signal calculation unit 7 may be changed in the air flow meter 1 of the present embodiment as will be described hereinafter.

Figure 5:
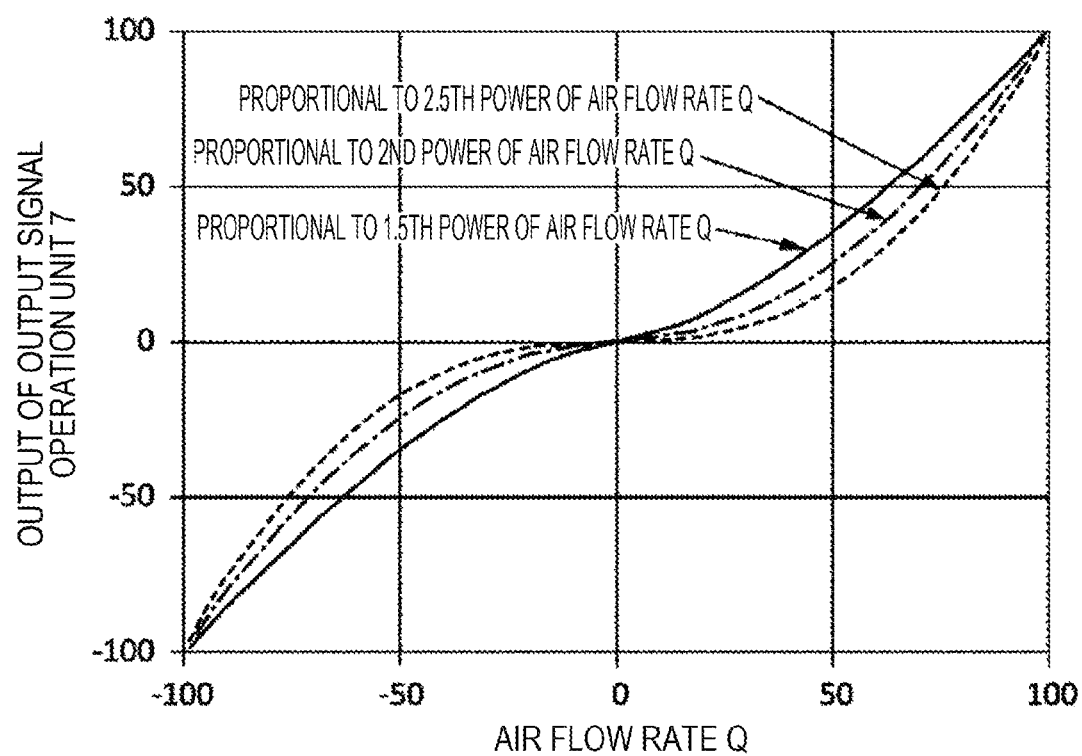
FIG. 5 is a graph illustrating an example of an output characteristic of the output signal calculation unit with respect to an air flow rate.

FIG. 5 is a graph illustrating an example of the output characteristic of the output signal calculation unit 7 with respect to the air flow rate Q. FIG. 5 illustrates an example of the output characteristic of the output signal calculation unit 7 proportional to the 1.5th, 2nd and 2.5th powers of the air flow rate Q, respectively. In the exponentiator 9 of the output signal calculation unit 7, such a change of the output characteristic may be realized by changing the power of the exponentiation with respect to the output signal Qout in response to the passage structure of the intake pipe 12 and the magnitude of the air flow rate Q represented by the output signal Qout. Incidentally, the exponentiation larger than one is generally required, and thus, a value that is larger than one is set as the power.

In addition, a polarity (positive/negative) of an output of the output signal calculation unit 7 is also switched in response on a polarity (positive/negative) of the air flow rate Q in the example of the output characteristic of the output signal calculation unit 7 illustrated in FIG. 5. That is, the output of the output signal calculation unit 7 is also a positive value when the output signal Qout indicates a positive value of the air flow rate Q, and the output of the output signal calculation unit 7 is also a negative value when the output signal Qout is a negative value of the air flow rate Q. In this manner, the calculation unit 2 operates normally even if backflow occurs in the air flow rate Q.

Incidentally, the output characteristic of the output signal calculation unit 7 is point-symmetric with the origin as the center, and increases or decreases at the same rate both the cases where the output signal Qout is positive and negative in the example of FIG. 5. This is based on the premise that the sub-passage 14 has a symmetric structure, and the passage length L2 and the loss factor C2 of the sub-passage 14 do not change even if the air flow rate Q flows back. However, there is a case where the sub-passage 14 has an asymmetric structure in the actual passage structure of the intake pipe 12. In order to cope with such a case, the output characteristic of the output signal calculation unit 7 may be changed depending on the polarity of the output signal Qout in the air flow meter 1 of the present embodiment. An example thereof will be described hereinafter with reference to FIG. 6.

Figure 6:
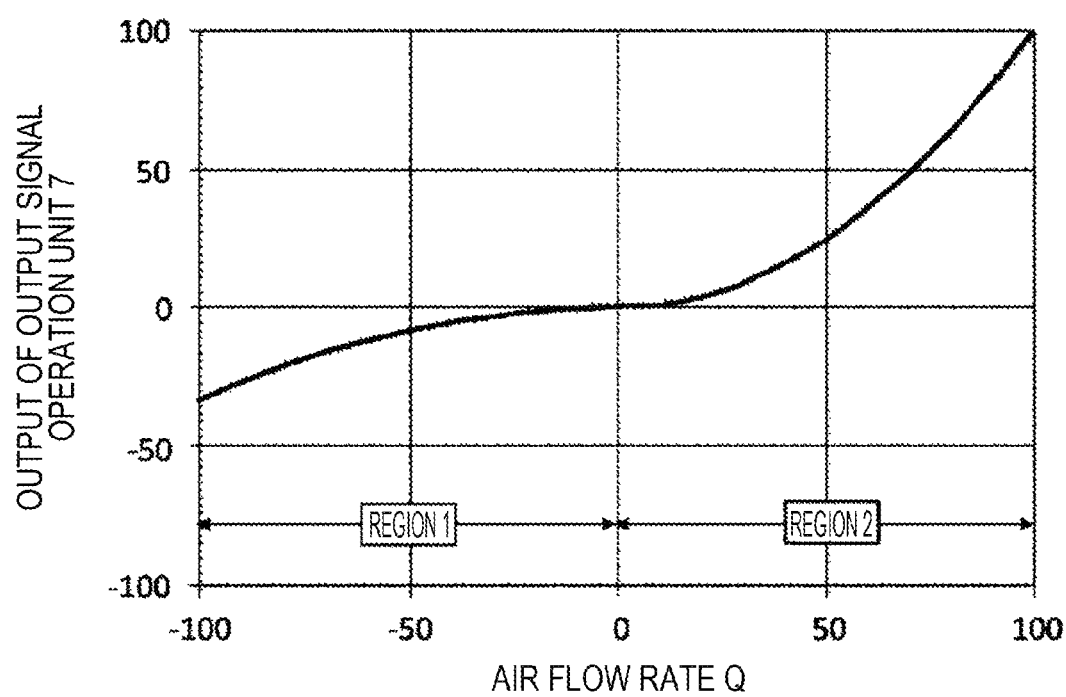
FIG. 6 is a graph illustrating another example of the output characteristic of the output signal calculation unit with respect to the air flow rate.

FIG. 6 is a graph illustrating another example of the output characteristic of the output signal calculation unit 7 with respect to the air flow rate. In the example of FIG. 6, an inclination of the output of the output signal calculation unit 7 is changed between Region 1 corresponding to the negative air flow rate Q and Region 2 corresponding to the positive air flow rate Q. In the multiplier 8 of the output signal calculation unit 7, such a change of the output characteristic can be realized by changing the proportionality constant by which the output signal Qout is multiplied in response to the polarity of the output signal Qout.

Since the proportionality constant of the multiplier 8 is changed depending on the polarity of the output signal Qout in the output signal calculation unit 7 as described above, the pulsation error correction can also be performed by applying the air flow meter 1 of the present embodiment for the sub-passage 14 having the asymmetric passage structure.

Here, the change of the output characteristic as described above is not limited to the output signal calculation unit 7, and is similarly applicable to the input signal calculation unit 4. That is, when considering the actual passage structure of the intake pipe 12, the loss factors C1 and C2 become functions of the air flow rates Q1 and Q2 as described above. Thus, it is preferable to set an output characteristic of the input signal calculation unit 4 to a characteristic proportional to the 1.5th power, a characteristic proportional to the second power, and a characteristic proportional to the 2.5th power, of the air flow rate Q in the same manner as described in FIG. 5 for the output signal calculation unit 7. Specifically, such a change of the output characteristic can be realized by changing the power of the exponentiation with respect to the input signal Qsen in response to the passage structure of the intake pipe 12 and the magnitude of the air flow rate Q2 represented by the input signal Qsen in the exponentiator 11 of the input signal calculation unit 4. Incidentally, the exponentiation larger than one is generally required, and thus, a value that is larger than one is set as the power. In addition, there is a case where the sub-passage 14 has the asymmetric structure in the actual passage structure of the intake pipe 12. Therefore, the output characteristic of the input signal calculation unit 4 may be changed depending on the polarity of the input signal Qsen in the same manner as described in FIG. 6 for the output signal calculation unit 7 in order to cope with such a case. Specifically, the proportionality constant by which the input signal Qsen is multiplied is changed depending on the polarity of the input signal Qsen in the multiplier 10 of the input signal calculation unit 4, and thus, such a change of the output characteristic can be realized. As a result, it is possible to perform pulsation error correction by applying the air flow meter 1 of the present embodiment even to the sub-passage 14 having the asymmetric passage structure.

Next, adjustment of a loop gain of the calculation unit 2 will be described. In the air flow meter 1 of the present embodiment, there is a closed-loop system constituted by the output signal calculation unit 7, the subtractor 5, and the integrator 6 in the calculation unit 2 as illustrated in FIG. 1. This closed-loop system is stable in principle, but a circuit delay or a delay due to a calculation period occurs when being actually implemented as an analog circuit, a digital circuit, or a program in the calculation unit 2. Due to such a delay, the closed-loop system becomes unstable in some cases if the loop gain becomes too large. Therefore, it is preferable to adjust the loop gain to be small when the air flow rate Q is large in the air flow meter 1 of the present embodiment in order to prevent the closed-loop system from being unstable as described above. An example thereof will be described hereinafter with reference to FIG. 7.

Figure 7:
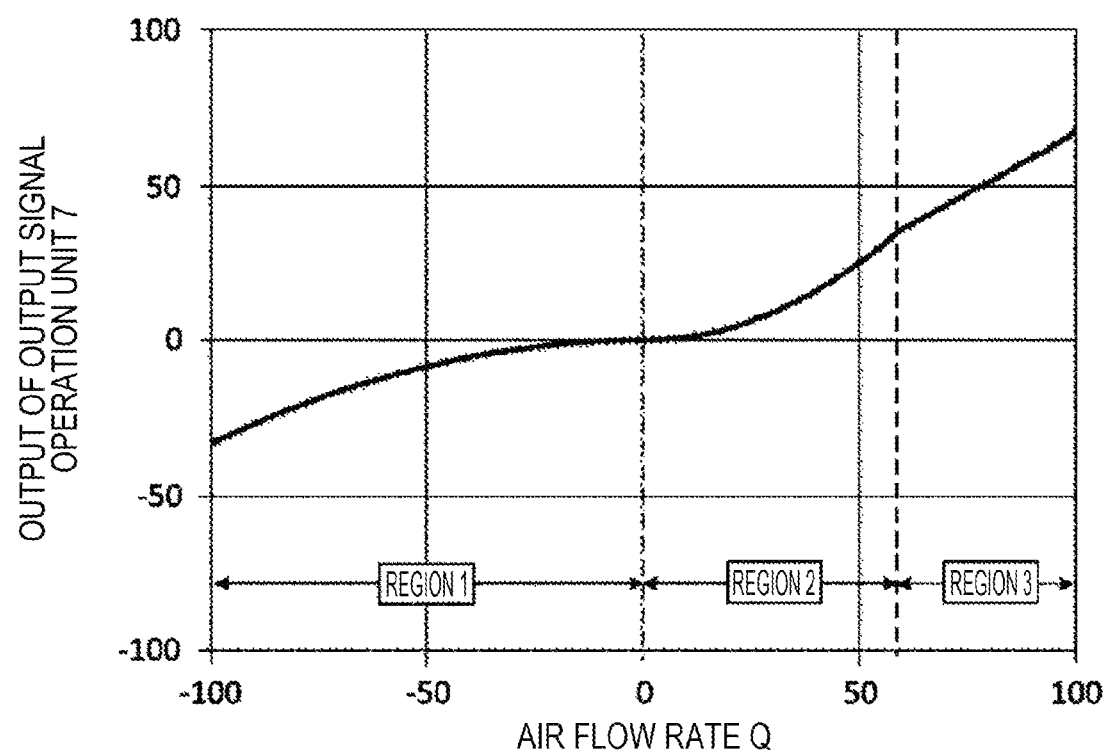
FIG. 7 is a graph illustrating still another example of the output characteristic of the output signal calculation unit with respect to the air flow rate.

FIG. 7 is a graph illustrating still another example of the output characteristic of the output signal calculation unit 7 with respect to the air flow rate. In the example of FIG. 7, Region 1 corresponding to the negative air flow rate Q is similar to that in FIG. 6, but a region corresponding to the positive air flow rate Q is divided into two regions (Region 2 and Region 3), and the output of the output signal calculation unit 7 changes between these regions. The exponentiator 9 of the output signal calculation unit 7 changes the power of the exponentiation with respect to the output signal Qout depending on the magnitude of the air flow rate Q represented by the output signal Qout. Specifically, the power of the exponentiation performed by the exponentiator 9 in Region 3 corresponding to a large flow rate region is made smaller than that in Region 2. As a result, the change of the output characteristic as illustrated in FIG. 7 can be realized.

The loop gain of the closed-loop system in the calculation unit 2 is determined by a product of the respective gains of the output signal calculation unit 7, the subtractor 5 and the integrator 6. Since the exponentiator 9 performs the exponentiation of the output signal Qout in the output signal calculation unit 7, the gain of the output signal calculation unit 7 increases exponentially as the air flow rate Q represented by the output signal Qout increases. Therefore, it is preferable to suppress the increase of the gain by reducing the power of the exponentiation performed by the output signal calculation unit 7 in the large flow rate region such as Region 3 in FIG. 7 in the air flow meter 1 of the present embodiment in order to keep the increase of the gain of the output signal calculation unit 7 within a predetermined range. As a result, it is possible to prevent the closed-loop system from becoming unstable due to the too large loop gain of the closed-loop system in the calculation unit 2. In other words, the calculation unit 2 can operate stably even if the calculation period is delayed in the air flow meter 1 of the present embodiment. Thus, it is possible to adopt a cheaper circuit configuration.

Next, a low-pass filter characteristic of the calculation unit 2 will be described. In the air flow meter 1 of the present embodiment, there is the closed-loop system constituted by the output signal calculation unit 7, the subtractor 5, and the integrator 6 in the calculation unit 2 as described above. This closed-loop system can be regarded as a feedback system in which feedback is provided to the integrator 6 by the output signal calculation unit 7, and has the low-pass filter (LPF) characteristic with respect to the input signal Qsen input to the calculation unit 2. A cutoff frequency of this LPF characteristic is proportional to the gain of the output signal calculation unit 7. In addition, since the exponentiator 9 performs the exponentiation of the output signal Qout in the output signal calculation unit 7, the gain of the output signal calculation unit 7 increases as the air flow rate Q represented by the output signal Qout increases, and the cutoff frequency in the LPF characteristic of the calculation unit 2 also increases.

Figure 8:
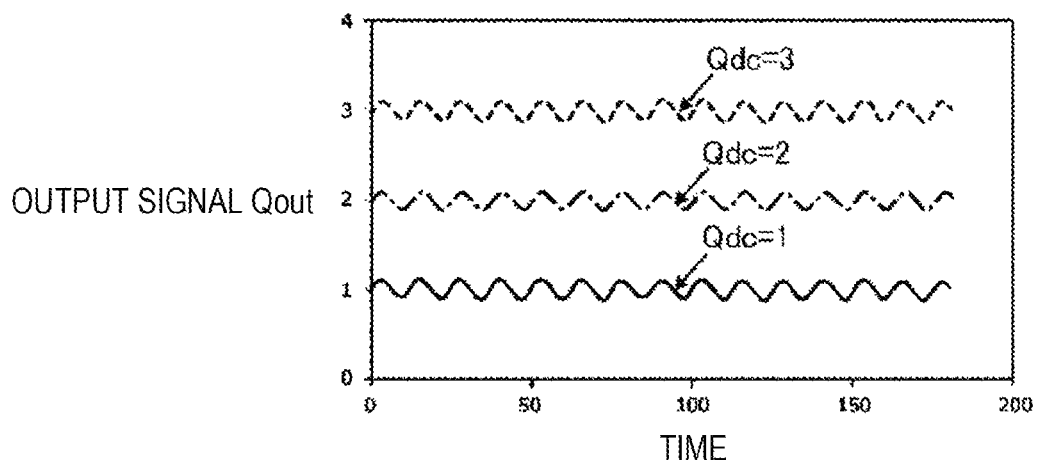
FIG. 8 is a graph illustrating waveform examples of output signals with different DC levels.
Figure 9:
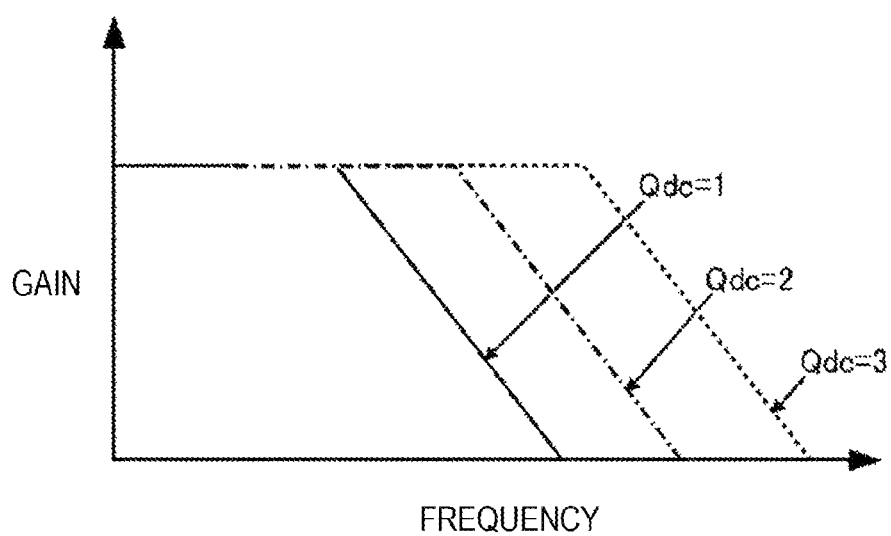
FIG. 9 is a graph illustrating examples of frequency characteristics of the respective waveforms of the output signals.
Figure 10:
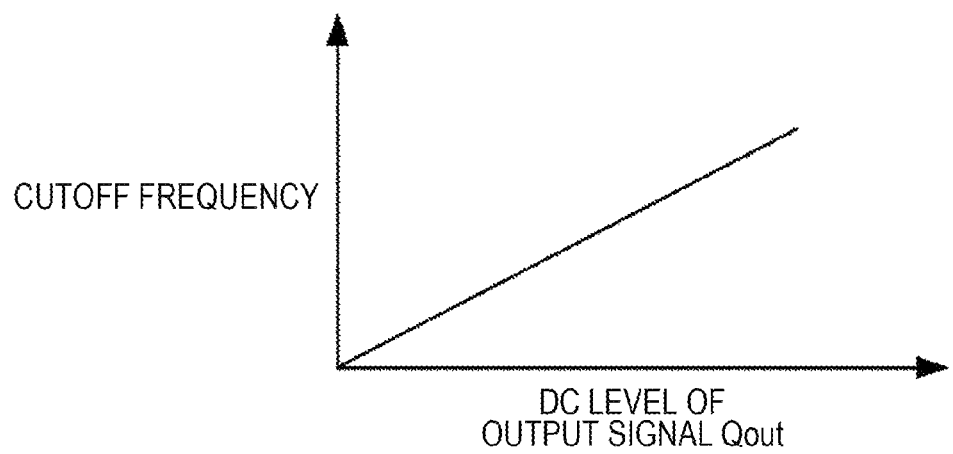
FIG. 10 is a graph illustrating a relationship between the DC level of the output signal and a cutoff frequency.

The above-described relationship between the air flow rate Q and the cutoff frequency will be described hereinafter with reference to FIGS. 8, 9, and 10. FIG. 8 is a graph illustrating waveform examples of the output signals Qout having different DC levels, FIG. 9 is a graph illustrating examples of frequency characteristics of the respective waveforms of the output signals Qout illustrated in FIG. 8, and FIG. 10 is a graph illustrating a relationship between a DC level of the output signal Qout and the cutoff frequency in the LPF characteristic of the calculation unit 2.

The cutoff frequency in the LPF characteristic of the calculation unit 2 changes depending on the magnitude of the output signal Qout. Thus, when the DC level of the output signal Qout is changed as illustrated in FIG. 8, for example, the LPF characteristic in which the cutoff frequency increases as the DC level of the output signal Qout increases is exhibited as illustrated in FIG. 9. That is, the cutoff frequency in the LPF characteristic of the calculation unit 2 increases as the DC level of the output signal Qout increases. In particular, when the characteristic of the exponentiator 9 of the output signal calculation unit 7 is a square characteristic and the power of the exponentiation for the output signal Qout is two, the cutoff frequency in the LPF characteristic of the calculation unit 2 changes in proportion to the output signal Qout as illustrated in FIG. 10.

As described above, the cutoff frequency in the LPF characteristic of the calculation unit 2 changes depending on the DC level of the output signal Qout in the air flow meter 1 of the present embodiment. As a result, it is possible to improve the responsiveness of the calculation unit 2 as compared with the case where the cutoff frequency changes depending on a DC level of input signal Qsen. This point will be described hereinafter with reference to FIG. 11.

Figure 11:
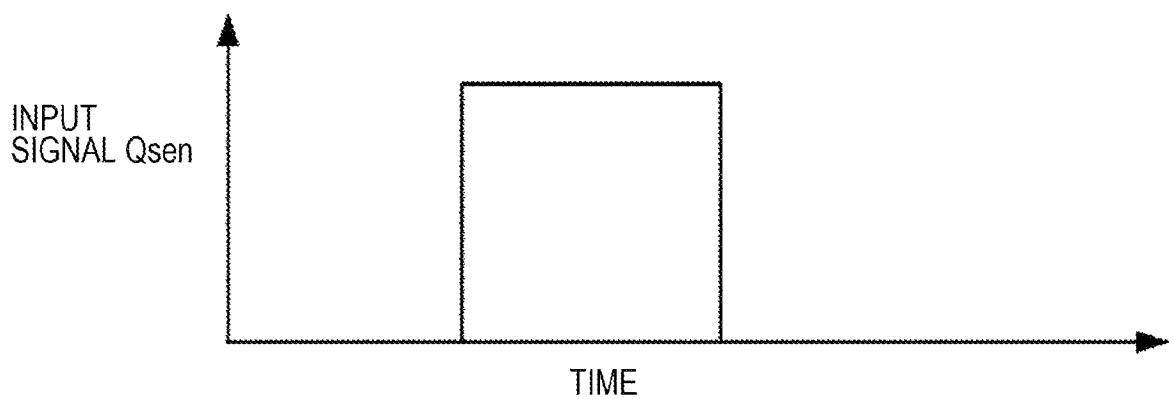
FIG. 11 is a graph illustrating a waveform example of the output signal when an input signal is changed stepwise.
Figure 11:
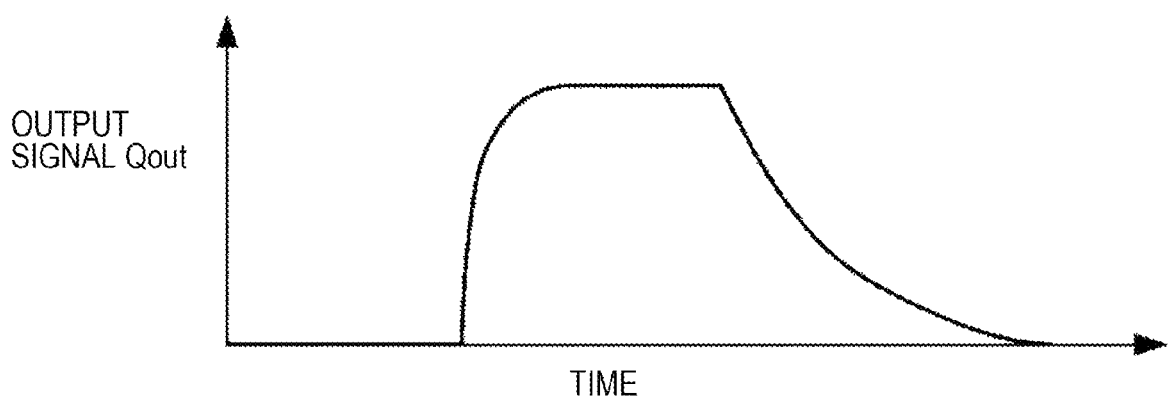
Figure 11:
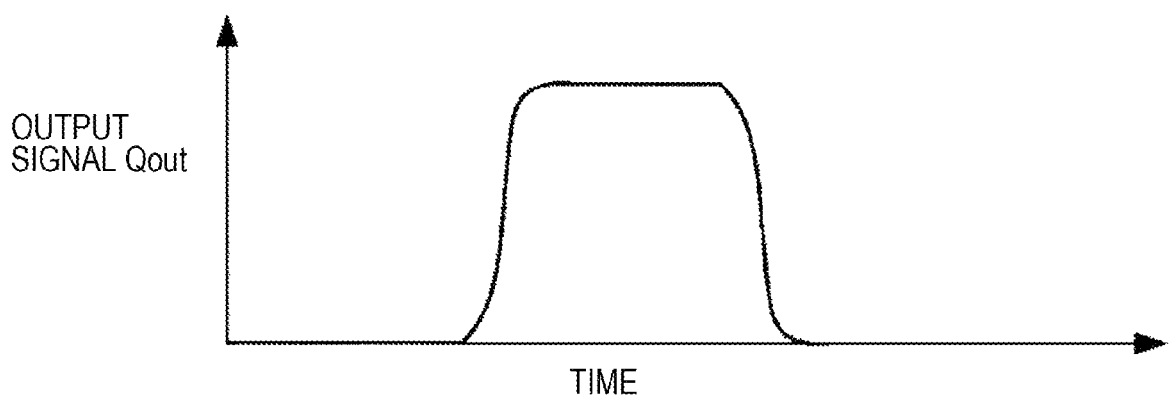

FIG. 11 is a graph illustrating a waveform example of the output signal Qout when the input signal Qsen is changed stepwise. As illustrated in FIG. 11(a), if the input signal Qsen changing stepwise is input to the calculation unit 2, the output signal Qout having the waveform as illustrated in FIG. 11(b) is output from the calculation unit 2 when it is assumed that the cutoff frequency in the LPF characteristic of the calculation unit 2 is proportional to the input signal Qsen. The waveform of the output signal Qout rises quickly but falls very slowly. Thus, it is understood that the output signal Qout from the calculation unit 2 causes a significant response delay with respect to the change of the input signal Qsen. In this manner, when the cutoff frequency is proportional to the input signal Qsen, the input signal Qsen approaches zero at the time of falling, and the responsiveness of the calculation unit 2 is extremely lowered.

On the other hand, the cutoff frequency in the LPF characteristic of the calculation unit 2 is proportional to not the input signal Qsen but the output signal Qout in the air flow meter 1 of the present embodiment. In this case, the output signal Qout having the waveform as illustrated in FIG. 11(c) is output from the calculation unit 2. The waveform of the output signal Qout is sufficiently fast in both rising and falling. Thus, it is understood that the output signal Qout from the calculation unit 2 does not cause a significant response delay with respect to the change of the input signal Qsen.

As described above, the cutoff frequency in the LPF characteristic of the calculation unit 2 is set to be proportional to the output signal Qout in the air flow meter 1 of the present embodiment, and thus, it is possible to avoid the significant response delay that occurs when the cutoff frequency is proportional to the input signal Qsen. Thus, it is possible to improve the responsiveness of the calculation unit 2.

According to the first embodiment of the present invention described above, the following operational effects are achieved.

(1) The air flow meter 1 includes: the air flow rate detection element 3 that generates the input signal Qsen relating to the air flow rate to be measured; and the calculation unit 2 that performs calculation to generate the output signal Qout in response to the air flow rate based on the input signal Qsen. The calculation unit 2 includes: the output signal calculation unit 7 that performs calculation including exponentiation of raising the power of the output signal Qout by more than one; the input signal calculation unit 4 that performs calculation on the input signal Qsen; the subtractor 5 that obtains the difference between the calculation result by the output signal calculation unit 7 and the calculation result by the input signal calculation unit 4; and the integrator 6 that integrates the difference obtained by the subtractor 5, and the output signal Qout is generated based on the output from the integrator 6. Thus, the output signal Qout from which the pulsation error has been removed can be obtained by solving the above-described function of Formula (6). Therefore, it is possible to provide the air flow meter 1 capable of rapidly following the change of the pulsation state of the input signal Qsen.

(2) The exponentiator 9 of the output signal calculation unit 7 calculates, for example, the second power of the output signal in the exponentiation on the output signal Qout. Thus, the calculation corresponding to Q*Q in the second term of the right side of Formula (6) can be realized in the output signal calculation unit 7.

(3) The output signal calculation unit 7 includes the multiplier 8 that multiplies the output signal Qout by the predetermined proportionality constant, and the exponentiator 9 that performs exponentiation on the output signal Qout. The multiplier 8 may change the proportionality constant depending on the polarity of the output signal Qout as described in FIG. 6. In this manner, it is possible to perform the pulsation error correction even when measuring the air flow rate in the asymmetric passage structure.

(4) As described with reference to FIG. 5, the output signal calculation unit 7 may change the power of the exponentiation depending on the magnitude of the air flow rate represented by the output signal Qout. In this manner, the accurate pulsation error correction can be performed in consideration of the change of the loss factor in response to the air flow rate in the actual passage structure for measuring the air flow rate.

(5) The input signal calculation unit 4 includes the exponentiator 11 that performs exponentiation of raising the power of the input signal Qsen by more than one. Thus, the calculation corresponding to Q*Q in the first term of the right side of Formula (6) can be realized in the output signal calculation unit 7. In addition, the accurate pulsation error correction can be performed in consideration of the change of the loss factor in response to the air flow rate in the actual passage structure for measuring the air flow rate.

(6) The input signal calculation unit 4 includes the multiplier 10 that multiplies the input signal Qsen by the predetermined proportionality constant. The multiplier 10 may change the proportionality constant depending on the polarity of the input signal Qsen. In this manner, it is possible to perform the pulsation error correction even when measuring the air flow rate in the asymmetric passage structure.

(7) The calculation unit 2 has a low-pass filter function of cutting off a frequency component equal to or higher than the predetermined cutoff frequency from the input signal Qsen, and the cutoff frequency of the low-pass filter function changes depending on the instantaneous value of the output signal Qout. Thus, it is possible to improve the responsiveness of the calculation unit 2.

Second Embodiment

Figure 12:
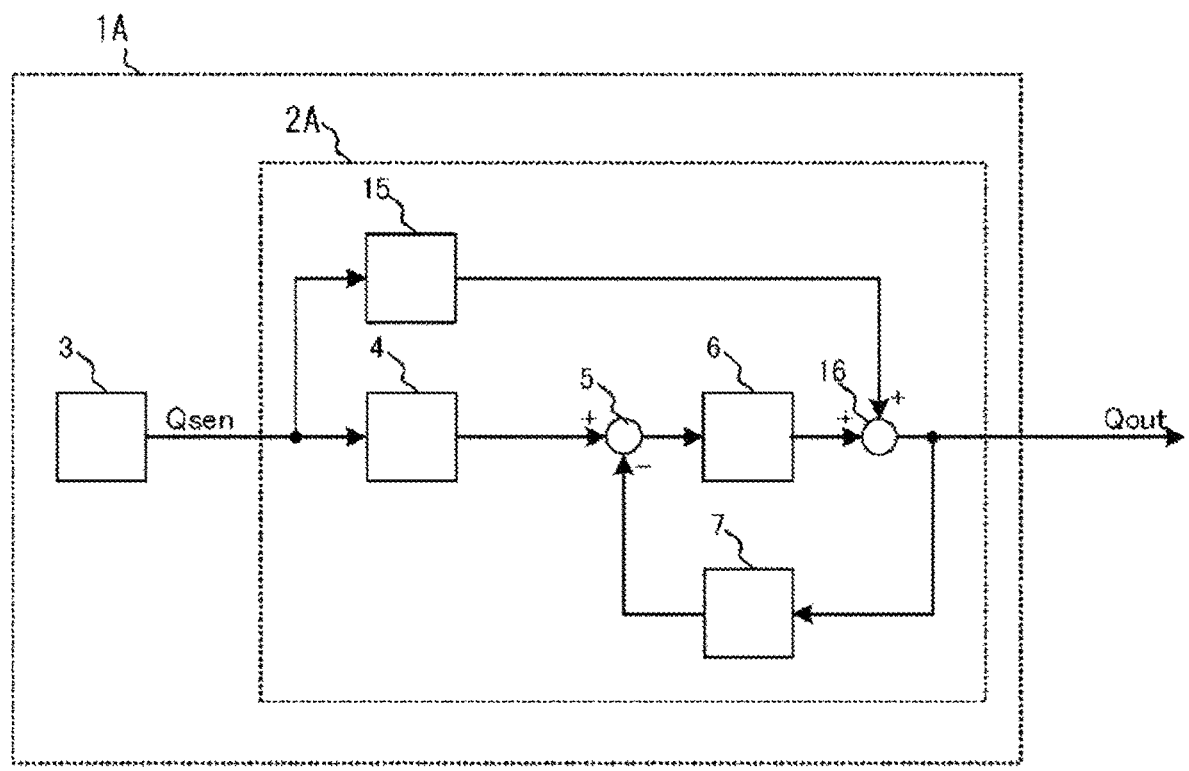
FIG. 12 is a diagram illustrating a configuration of an air flow meter according to a second embodiment of the present invention.

Next, an air flow meter according to a second embodiment of the present invention will be described with reference to FIGS. 12 to 14. FIG. 12 is a diagram illustrating a configuration of an air flow meter 1A according to the second embodiment of the present invention. The air flow meter 1A of the present embodiment includes a calculation unit 2A instead of the calculation unit 2 of the air flow meter 1 that has been described in the first embodiment. The calculation unit 2A basically has the same configuration as the calculation unit 2, but is different in terms of further including a second input signal calculation unit 15 and an adder 16. The second input signal calculation unit 15 performs predetermined calculation on the input signal Qsen input from the air flow rate detection element 3 to the calculation unit 2A. The adder 16 calculates a sum of an output from the integrator 6, that is, a difference between a calculation result by the output signal calculation unit 7 and a calculation result by the input signal calculation unit 4, and a calculation result by the second input signal calculation unit 15 to generate and output the output signal Qout.

Figure 13:
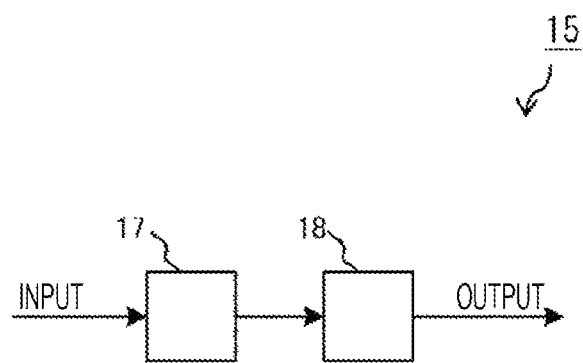
FIG. 13 is a diagram illustrating a configuration of a second input signal calculation unit.
Figure 14:
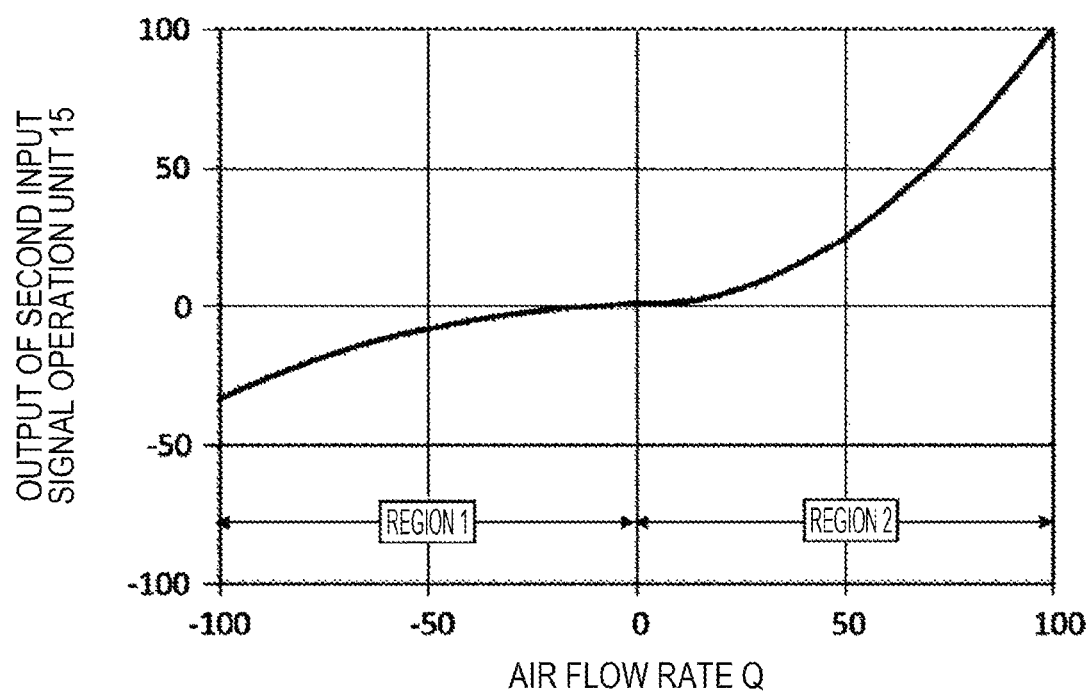
FIG. 14 is a graph illustrating an example of an output characteristic of the second input signal calculation unit with respect to an air flow rate.

FIG. 13 is a diagram illustrating a configuration of the second input signal calculation unit 15. As illustrated in FIG. 13, the second input signal calculation unit 15 is constituted by a multiplier 17 that multiplies the input signal Qsen by a predetermined proportionality constant, and an exponentiator 18 that performs exponentiation of the input signal Qsen.

In the air flow meter 1A of the present embodiment, the second input signal calculation unit 15 performs calculation to obtain the first term of the right side of Formula (5), that is, L2/L1*Q2. Specifically, using Q2=Qsen, the multiplier 17 performs multiplication of a proportionality constant corresponding to L2/L1 on the input signal Qsen, and the exponentiator 18 performs exponentiation corresponding to *Qsen, that is, calculates the first power of the input signal Qsen. Then, the adder 16 performs calculation of adding a calculation result of the second input signal calculation unit 15 to the output from the integrator 6, that is, the value corresponding to the right side of Formula (6). As a result, the output signal Qout from which a pulsation error has been removed can be obtained even for the input signal Qsen including a higher radio frequency pulsation by solving the function represented by Formula (5). As a result, the air flow rate Q flowing through the intake pipe 12 can be obtained from time to time even more accurately. In other words, the present invention can be applied to the air flow meter where a radio frequency pulsation occurs in air flow rate to be measured, for example, an air flow meter used in an automobile engine.

Incidentally, an output characteristic may be changed depending on a polarity of the input signal Qsen even for the second input signal calculation unit 15 of the present embodiment similarly to the input signal calculation unit 4 described in the first embodiment. FIG. 14 is a graph illustrating an example of an output characteristic of the second input signal calculation unit 15 with respect to an air flow rate. In the example of FIG. 14, an inclination of the output of the second input signal calculation unit 15 is changed between Region 1 corresponding to the negative air flow rate Q and Region 2 corresponding to the positive air flow rate Q. The proportionality constant by which the input signal Qsen is multiplied is changed depending on the polarity of the input signal Qsen in the multiplier 17 of the second input signal calculation unit 15, and thus, such a change of the output characteristic can be realized. In this manner, for example, the proportionality constant of the multiplier 17 can be changed depending on the polarity of the input signal Qsen in the second input signal calculation unit 15. As a result, pulsation error correction can be performed by applying the air flow meter 1A of the present embodiment even to an asymmetric passage structure.

According to the second embodiment of the present invention described above, the calculation unit 2A further includes the second input signal calculation unit 15 that performs calculation on the input signal Qsen and the adder 16 that calculates the sum of the output from the integrator 6 and the calculation result of the second input signal calculation unit 15, and the output signal Qout is generated based on the output from the adder 16. Accordingly, the output signal Qout from which the pulsation error has been removed can be obtained even for the input signal Qsen including the higher radio frequency pulsation.

In addition, the second input signal calculation unit 15 includes the multiplier 17 that multiplies the input signal Qsen by the predetermined proportionality constant according to the second embodiment of the present invention. The multiplier 17 may change the proportionality constant depending on the polarity of the input signal Qsen. In this manner, it is possible to perform the pulsation error correction even when measuring the air flow rate in the asymmetric passage structure.

Third Embodiment

Figure 15:
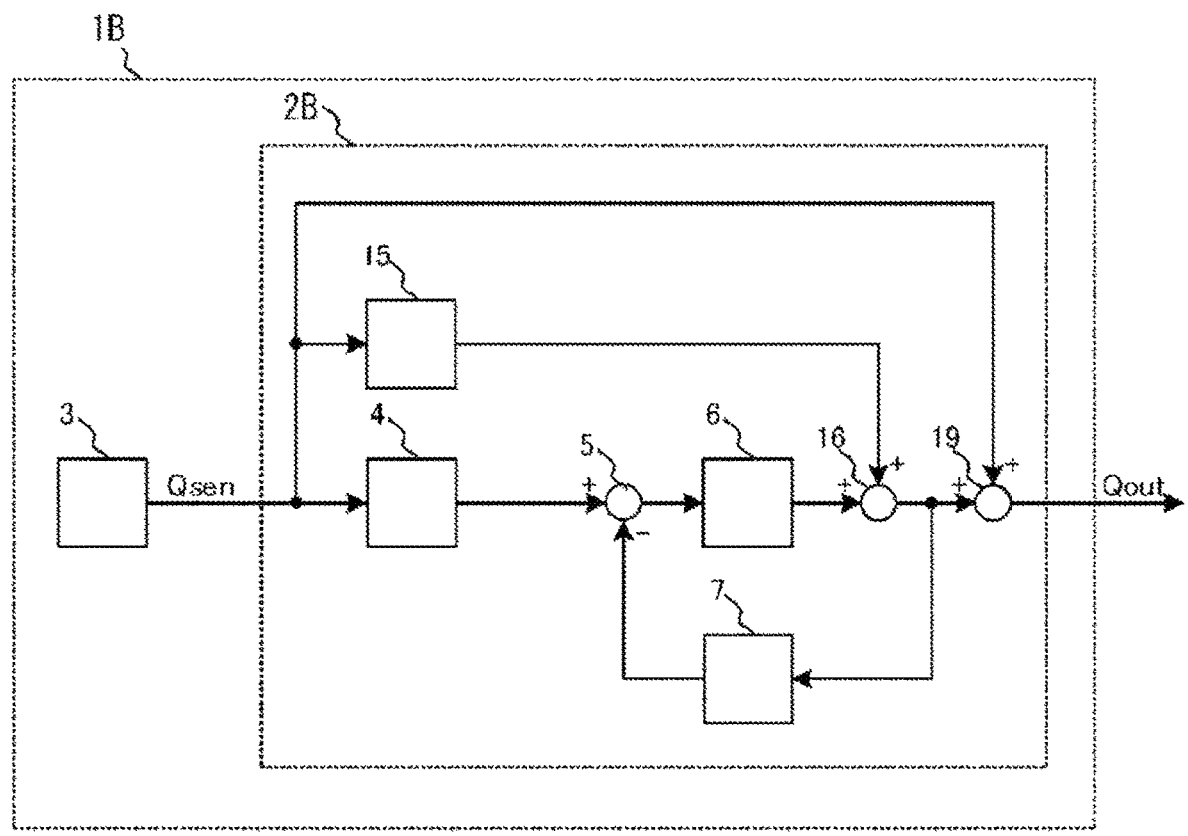
FIG. 15 is a diagram illustrating a configuration of an air flow meter according to a third embodiment of the present invention.

Next, an air flow meter according to a third embodiment of the present invention will be described with reference to FIG. 15. FIG. 15 is a diagram illustrating a configuration of an air flow meter 1B according to the third embodiment of the present invention. The air flow meter 1B of the present embodiment includes a calculation unit 2B instead of the calculation unit 2 of the air flow meter 1 that has been described in the first embodiment. The calculation unit 2B basically has the same configuration as the calculation unit 2A described in the second embodiment, but is different in terms of further including an adder 19. The adder 19 generates the output signal Qout by calculating a sum of the input signal Qsen input from the air flow rate detection element 3 to the calculation unit 2B and an output from the adder 16 to output the output signal Qout.

In the air flow meter 1B of the present embodiment, the adder 19 performs calculation to obtain the third term of the right side of Formula (4), that is, +Q2. Specifically, using Q2=Qsen, the adder 19 performs calculation of adding the input signal Qsen to the output from the adder 16, that is, the value corresponding to the right side of Formula (5). As a result, the air flow rate Q flowing through the intake pipe 12 can be determined from time to time with still higher accuracy by solving the function represented by Formula (4). That is, the present invention can be applied to an air flow meter that requires highly accurate measurement even for a low flow rate region.

According to the third embodiment of the present invention described above, the same operational effects as those described in the first and second embodiments can be achieved.

Incidentally, the example of obtaining the output signal Qout from the input signal Qsen by performing various operations of addition, subtraction, multiplication, and exponentiation has been described in the respective calculation units 2, 2A, and 2B in the respective embodiments described above, but any of these operations may be replaced with an operation based on a predetermined relationship. For example, it is also possible to store map information representing a relationship between an input value and an output value with one-to-one correspondence at a predetermined numerical interval in advance in the calculation unit 2, 2A, or 2B and substitute a part or all of the operations performed by the calculation unit 2, 2A, or 2B by an operation using the map information.

The above-described respective embodiments and various modified examples are merely examples, and the present invention is not limited to these contents unless the features of the invention are impaired. In addition, the various embodiments and modified examples have been described as above, but the present invention is not limited to these contents. Other aspects conceivable within a technical idea of the present invention are also included within the scope of the present invention.

REFERENCE SIGNS LIST 1, 1A, 1B air flow meter
2, 2A, 2B calculation unit 3 air flow rate detection element
4 input signal calculation unit
5 subtractor
6 integrator
7 output signal calculation unit
8 multiplier
9 exponentiator
10 multiplier
11 exponentiator
12 intake pipe
13 main passage
14 sub-passage
15 second input signal calculation unit
16 adder
17 multiplier
18 exponentiator
19 adder

The invention claimed is:

1. An air flow meter comprising:
an air flow rate detection element that generates an input signal relating to an air flow rate to be measured; and
a calculation unit that performs a calculation to generate an output signal in response to the air flow rate based on the input signal, wherein
the calculation unit comprises:
an output signal calculation unit that performs calculation including exponentiation of raising a power of the output signal by more than one;
an input signal calculation unit that performs calculation on the input signal;
a subtractor that obtains a difference between a calculation result by the output signal calculation unit and a calculation result by the input signal calculation unit; and
an integrator that integrates the difference obtained by the subtractor, and
the output signal is generated based on an output from the integrator.

2. The air flow meter according to claim 1, wherein
the output signal calculation unit calculates a second power of the output signal in the exponentiation.

3. The air flow meter according to claim 1, wherein
the output signal calculation unit comprises a first multiplier that multiplies the output signal by a predetermined proportionality constant and a first exponentiator that performs the exponentiation on the output signal, and
the first multiplier changes the proportionality constant in response to a polarity of the output signal.

4. The air flow meter according to claim 1, wherein
the output signal calculation unit changes a power of the exponentiation depending on a magnitude of the air flow rate represented by the output signal.

5. The air flow meter according to claim 1, wherein
the input signal calculation unit comprises a second exponentiator that performs exponentiation larger than one on the input signal.

6. The air flow meter according to claim 1, wherein
the input signal calculation unit comprises a second multiplier that multiplies the input signal by a predetermined proportionality constant, and
the second multiplier changes the proportionality constant in response to a polarity of the input signal.

7. The air flow meter according to claim 1, wherein
the calculation unit further comprises:
a second input signal calculation unit that performs calculation on the input signal; and
an adder that calculates a sum of an output from the integrator and a calculation result of the second input signal calculation unit, and
the output signal is generated based on an output from the adder.

8. The air flow meter according to claim 7, wherein
the second input signal calculation unit comprises a third multiplier that multiplies the input signal by a predetermined proportionality constant, and
the third multiplier changes the proportionality constant in response to a polarity of the input signal.

9. The air flow meter according to claim 1, wherein
the calculation unit has a low-pass filter function of cutting off a frequency component equal to or higher than a predetermined cutoff frequency from the input signal, and
the cutoff frequency changes depending on an instantaneous value of the output signal.

10. An air flow meter comprising:
an air flow rate detection element that generates an input signal relating to an air flow rate to be measured; and
a calculation unit that performs calculation to generate an output signal in response to the air flow rate based on the input signal,
wherein the calculation unit has a low-pass filter function of cutting off a frequency component equal to or higher than a predetermined cutoff frequency from the input signal, and
the cutoff frequency changes depending on an instantaneous value of the output signal.

* * * * *